(12) United States Patent
Cohen-Tidhar et al.

(10) Patent No.: US 12,243,274 B2
(45) Date of Patent: Mar. 4, 2025

(54) SYSTEM, DEVICE, AND METHOD FOR IMPROVED ENCODING AND ENHANCED COMPRESSION OF IMAGES, VIDEOS, AND MEDIA CONTENT

(71) Applicant: CLOUDINARY LTD., Petah Tikva (IL)

(72) Inventors: Amnon Cohen-Tidhar, Zoran (IL); Jon Philippe D. Sneyers, Asse (BE); Tal Lev-Ami, Modiin (IL)

(73) Assignee: CLOUDINARY LTD., Petah Tikva (IL)

( * ) Notice: Subject to any disclaimer, the term of this patent is extended or adjusted under 35 U.S.C. 154(b) by 346 days.

(21) Appl. No.: 18/074,485

(22) Filed: Dec. 4, 2022

(65) Prior Publication Data

US 2023/0177734 A1   Jun. 8, 2023

Related U.S. Application Data

(60) Provisional application No. 63/286,588, filed on Dec. 7, 2021.

(51) Int. Cl.
| | | |
|---|---|---|
| *G06V 10/00* | (2022.01) | |
| *G06T 9/00* | (2006.01) | |
| *G06V 10/75* | (2022.01) | |
| *G06V 10/762* | (2022.01) | |
| *G06V 10/764* | (2022.01) | |

(52) U.S. Cl.
CPC .............. *G06T 9/00* (2013.01); *G06V 10/751* (2022.01); *G06V 10/762* (2022.01); *G06V 10/764* (2022.01)

(58) Field of Classification Search
CPC .... G06V 10/762; G06V 10/751; G06V 10/26; G06V 10/764; G06T 9/00; G06T 9/001; G06T 9/002; G06T 9/004; G06T 9/005; G06T 9/007; G06T 9/008; G06T 9/20; G06T 9/40
See application file for complete search history.

(56) References Cited

U.S. PATENT DOCUMENTS 5,430,555 A * 7/1995 Sawada ................ H04N 1/4105
382/254
6,728,317 B1 * 4/2004 Demos ................... H04N 19/55
348/E7.015

(Continued)

*Primary Examiner* — Amir Alavi
(74) *Attorney, Agent, or Firm* — AlphaPatent Associates Ltd.; Daniel J. Swirsky

(57) ABSTRACT

System, device, and method for improved encoding and enhanced compression of images, videos, and media content. A method includes: (a) receiving a source image, and analyzing its content on a pixel-by-pixel basis, and classifying each pixel as either (I) a pixel associated with Photographic content, or (II) a pixel associated with Non-Photographic content; (c) generating a pixel-clusters map that indicates (i) clusters of pixels that were classified as Photographic content, and (ii) clusters of pixels that were classified as Non-Photographic content; (d) generating a composed image, by: (d1) applying a first encoding technique, particularly lossy encoding, to encode pixel-clusters that were classified as Photographic content; (d2) applying a second, different, encoding technique, particularly lossless encoding, to encode pixel-clusters that were classified as Non-Photographic content.

20 Claims, 5 Drawing Sheets

(56) References Cited

U.S. PATENT DOCUMENTS

| | | | | |
|---|---|---|---|---|
| 6,931,067 B2* | 8/2005 | Jang | ............... | G06T 9/008 |
| | | | | 375/E7.041 |
| 8,229,234 B2* | 7/2012 | Takada | ............... | H04N 19/13 |
| | | | | 382/246 |
| 9,386,306 B2* | 7/2016 | Tu | ............... | H04N 19/61 |
| 9,591,329 B2* | 3/2017 | Kondo | ............... | H04N 19/159 |
| 10,085,038 B2* | 9/2018 | Sato | ............... | H04N 19/30 |
| 10,595,036 B2* | 3/2020 | Lu | ............... | H04N 19/50 |
| 10,687,060 B2* | 6/2020 | Sato | ............... | H04N 19/70 |
| 11,004,240 B2* | 5/2021 | Li | ............... | H04N 19/119 |
| 11,616,979 B2* | 3/2023 | Skupin | ............... | H04N 19/176 |
| | | | | 375/240.12 |
| 2019/0244012 A1* | 8/2019 | Thompson | ............... | G06V 40/171 |

* cited by examiner

Layer 221

SYSTEM, DEVICE, AND METHOD FOR IMPROVED ENCODING AND ENHANCED COMPRESSION OF IMAGES, VIDEOS, AND MEDIA CONTENT

CROSS-REFERENCE TO RELATED APPLICATIONS

This patent application claims benefit and priority from U.S. 63/286,588, filed on Dec. 7, 2021, which is hereby incorporated by reference in its entirety.

FIELD

Some embodiments are related to the field of video processing, image processing, and video playback.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, engaging in Instant Messaging (IM) and video conferences, playing games, or the like. Digital images and digital videos are often sent and received among users, are posted or shared by users via social networks, and are part of content shown on a variety of websites.

SUMMARY

Some embodiments include systems, devices, and methods of improved encoding and decoding, as well as enhanced compression and decompression, of images, videos, and media content. For example, a method includes: (a) receiving a source image, and analyzing its content on a pixel-by-pixel basis, and classifying each pixel as either (I) a pixel associated with Photographic content, or (II) a pixel associated with Non-Photographic content; (c) generating a pixel-clusters map that indicates (i) clusters of pixels that were classified as Photographic content, and (ii) clusters of pixels that were classified as Non-Photographic content; (d) generating a composed image, by: (d1) applying a first encoding technique, particularly lossy encoding, to encode pixel-clusters that were classified as Photographic content; (d2) applying a second, different, encoding technique, particularly lossless encoding, to encode pixel-clusters that were classified as Non-Photographic content.

Some embodiments may provide other and/or additional benefits and/or advantages.

DETAILED DESCRIPTION OF SOME DEMONSTRATIVE EMBODIMENTS

Figure 1:
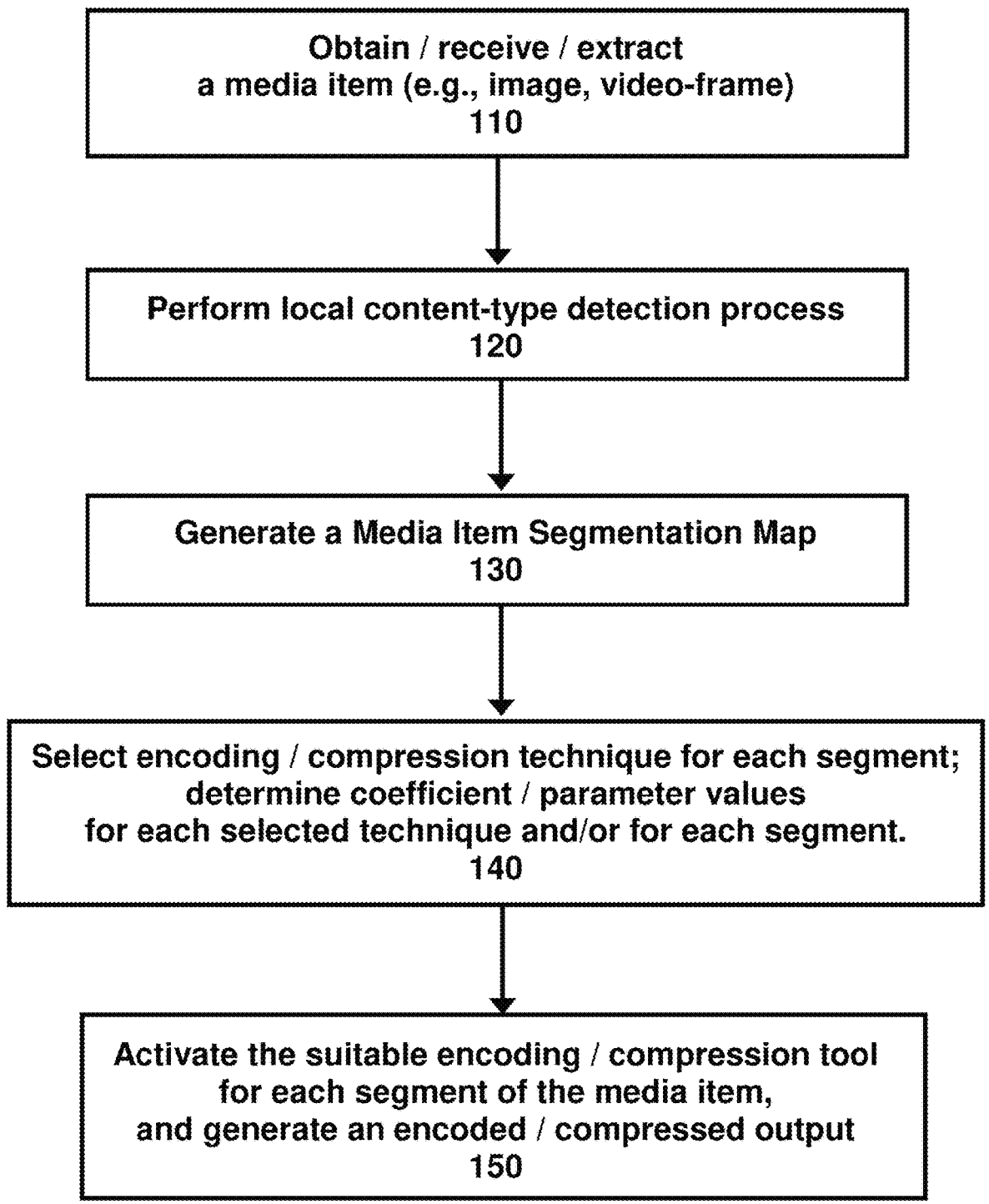
FIG. 1 is a flow-chart of a method, in accordance with some demonstrative embodiments.

The terms "media item" or "content item" as used herein may include, for example, an image, an image file, a video, a video clip, a movie, an animated sequence or an animation sequence, a set of images, a series of images, a video frame, a set of video frames, a graphics element, a graphics file, a multimedia presentation, a digital presentation, a presentation file, an animated GIF, an interactive graphical content item, and/or other types of media; which may be represented digitally by a single file, or a by a set of files, or by a bitstream or a streaming set of bits; which may be represented as raw data or uncompressed data or unencoded data, or as already-encoded or already-compressed data (e.g., compressed and/or encoded using JPEG or PNG or WebP or JPEG 2000 or JPEG XL or AVIF, as some non-limiting examples for images; compressed and/or encoded using AVC or H.264, or using H.265 or HEVC, or using VP9 or AV1, as some non-limiting examples for videos); and/or other suitable types of media items.

Some embodiments provide methods, systems, and devices for improved or enhanced encoding, decoding, compression and/or decompression of media items; particularly, based on analysis and detection of one or more local visual content-types that characterize one or more segments or blocks or portions within the media item.

For demonstrative purposes, some portions of the discussion herein may relate to classification or categorization of content into one of two types of classes or categories; and particularly, into a class of Photographic content or conversely into a class of Non-Photographic content. However, these are only non-limiting examples, and some embodiments may similarly be used with other types of classifications or categorizations, and/or by performing classification or categorization of content based on other properties or characteristics, and/or by performing classification or categorization into one of three or four or more types of content classes or content categories.

The Applicants have realized that it may be possible to innovatively combine, in order to efficiently represent a single media item, two or more coding tools and/or encoding tools and/or compression techniques. Such tools or techniques may be, for example, parts of codec bitstream specifications for image and/or video compression and/or encoding; or may be other (e.g., proprietary, open source, standardized, non-standardized) compression or encoding techniques. The Applicants have realized that it may be possible to optimize or enhance or improve, for example, (I) the visual quality of compressed media content, and/or (II) the compression efficiency or density or the compression ratio.

The Applicants have realized that given a particular media item, the search space for attempting to select a particular encoder may be too large to achieve a feasible solution that exhaustively explores all encoding options; for example, it may require large processing resources and/or time resources to encode a single video clip or a single image using dozens of different encoding schemes or codecs in order to select the smallest-size encoded version; particularly when a computer server may need to process, encode and/or serve millions or even billions of media items in a short period of time and with a finite amount of available computing resource.

Moreover, realized the Applicants, due to lack of reliable perceptual metrics, in the case of lossy compression or lossy encoding it is not even possible to optimize for the true objective function, which is subjective image quality. For example, realized the Applicants, a system that would attempt to take an image, encode it as JPEG and as GIF and as PNG, and then select the smallest-size file (in bytes), may provide poor results; for example, since GIF compression supports up to 256 colors and may thus provide poor visual results for a color-rich photograph, and since JPEG artifacts may degrade the quality of a single-color computer-generated graphic element (e.g., a large red circle).

The Applicants have realized that a media item encoder (or compressor) may utilize heuristics in order to make decisions and determinations with regard to selection of particular coding tool(s) and/or encoding tool(s) and/or compression tool(s) to be used, and/or to determine the values of their parameters or coefficients, and/or to determine that a particular coding or encoding technique would be applied to a particular block or region within a media item. In accordance with some embodiments, such an encoder heuristic may be based on a detection of the local visual content type of one or more portions or regions or segments or blocks within a media item.

Some embodiments may classify or categorize visual content into one of two classes: (i) photographic content, e.g., visual content that is a photograph of a real object or real scenery; or visual content that is generally derived from a photograph taken by a camera or an imager or an image acquisition device; or (ii) non-photographic content, e.g., visual content that does not derive from a photograph captured by a camera (e.g., a text or a logo or a slogan shown on a background; a hand-drawn graphical element; computer-generated graphics or animations; or the like).

Some non-limiting examples of photographic content or photographic elements (e.g., stand-alone elements, or regions or components within a composed media item) may include, for example: a natural scene captured by a camera; a realistically-looking rendered computer-generated scene; imagery captured by visual imagers or sensors or by non-visual images or sensors (e.g., thermal imager or sensor; radar imager or sensor; LIDAR imager or sensor; ultrasound imager or sensor; X-ray imager or sensor; MRI imager; multi-spectral imager or sensor; or the like); medical images, or images acquired by medical devices or medical imaging devices or medical diagnostics devices; satellite images, or images acquired by a satellite; or the like.

Some non-limiting examples of non-photographic content or non-photographic elements (e.g., stand-alone elements, or regions or components within a composed media item) may include, for example: illustrations; handwritten text; hand-drawn illustrations; computerized illustrations; text; textual elements; logos and slogans; UI or GUI elements; digital artwork; pixel art; charts, diagrams, plots, pie charts, bar charts, flow charts; drawn maps; vector graphics; or the like.

The Applicants have realized that some media items, such as a single image or a single video-frame, may include a composition or a combination or a collage or an assembly or an aggregation of both: (i) one or more photographic elements, and (ii) one or more non-photographic elements. Such media item may be referred to herein as a "composed media item" or as a "combined media item" or as a "visually-diverse media item". Some non-limiting examples of a composed media items are, for example: (a) a screenshot taken from a website, which includes one or more photographs (photographic elements) and also textual elements and/or GUI elements (non-photographic elements); (b) an online news article, or a printed news article, that includes text (non-photographic element) and a photograph (photographic element); (c) an image or a photograph of a real-life object or product (e.g., a person, or a dog, or a pineapple, or a chair), that is placed in front of a synthetic background or an artificial background (e.g., a green screen; a background screen having uniform solid color, or having gradient color) that also has text overlays; (d) videogame footage, which may include realistically-looking rendered computer-generated scenes or objects or items (photographic elements) and also UI or GUI elements and digital artwork and on-screen text messages, score messages, level messages, lives left messages (non-photographic elements); (e) a photograph of a real-world object or scene, also having embedded therein a text caption or a watermark or a logo overlay; (f) an image of a website, newspaper, magazine, or book cover, that includes text, illustrations, and photographs.

The Applicants have realized that typically, photographic elements contain various types of "noise", and/or have a large number of different colors (e.g., millions of different colors per photographic element) and are often suitable for lossy transform-based compression. The Applicants have also realized that non-photographic elements are typically characterized by having no noise, and/or by having fewer colors (e.g., several dozens or several hundreds of distinct colors), and/or by having sharp edges and/or abrupt transitions from color to color within the image, and are thus more suitable for (or, may require) different compression techniques; since, for example, transform-based compression artifacts tend to be more problematic on such images, and/or because the compression density gains or the compression ratio that is achieved by photographic compression techniques are often less significant or less efficient on non-photographic content elements.

Some embodiments thus provide methods and systems for detecting different content-type segments or regions within a media item, and for segmenting such media item into two or more segments or regions, and for performing or enabling efficient and/or high-quality encoding and/or compression of such media content by taking into account the content-type that was determined for each such segment or region within the media item.

In some embodiments, a method may heuristically estimate the type of content, in a spatially localized way (e.g., for an image), or in a spatially and temporally localized way (e.g., for a video). The estimates may then be used to classify or to categorize an entire image, or an entire frame of a video, and/or to segment it into two or more layers or components; and to thus guide or instruct or configure or modify a suitable unit (e.g., an encoder unit, a compression unit, an encoder, a compressor) to apply one or more particular coding tools or encoding technique(s) or encoding scheme(s) or compression technique(s) or compression scheme(s), with regard to the entire media content and/or in a selective manner with regard to only a particular portion or region or layer or component of the media content; selected from a set or pool of generally-relevant or generally-applicable or available or pre-defined encoding/compression techniques or schemes, for example, Discrete Cosine Transform (DCT) or DCT-based encoding or DCT-based compression, Run-Length Encoding (RLE), lossy encoding or compression, lossless encoding or compression, palette indexed encoding or indexed color encoding, intra-frame prediction or intra-frame coding, lossy encoding or compression, lossless encoding or compression, or other suitable encoding techniques or compression techniques. Optionally, the method may further assist in determining or calculating or selecting, or in providing to the selected encoding/compression tool(s), one or more encoding coefficients or compression coefficients, or one or more encoding/compression parameter values or configurable variables, for each such particular region or segment or layer of the media item, in order to achieve high-quality visual results and/or high-efficiency compression ratio.

Reference is made to FIG. 1, which is a flow-chart of a method, in accordance with some embodiments.

For example, the method may include (block 110) obtaining or receiving or extracting a media item (e.g., image, video-frame); such as, by receiving it from a third party or a repository, by downloading it from a particular online URL or URI or location, by receiving it via an upload from a user, by capturing an image or video or image-frame from a camera or an imager, by extracting a single video-frame from a video or from a streaming video or from a video file, by receiving an already-encoded or an already-compressed image or video or media item, by generating a new image or a new video or a new video-frame out of one or more input elements, or the like.

The method may then perform a local content-type detection process (block 120); for example, to determine that one or more particular segments or regions within the media item are photographic content, or conversely are non-photographic content.

The method may then generate a Media Item Segmentation Map (block 130), which indicates one or more particular segments or regions in the media item, and further indicates one or more visual properties or content-type properties of each such segment or region; and particularly, indicates whether each such segment or region has photographic content or non-photographic content.

The method may then select a particular encoding/compression tool or encoder or compressor or technique, for each of the segments or regions within the media item; and optionally, may also determine or select or configure coefficient values and/or parameter values for the corresponding encoding/compression technique for each of the segments or regions within the media item (block 140).

The method may then activate, or may trigger or cause activation of, the suitable encoding/compression tool for each of the segments or regions of the media item, and may generate an encoded and/or compressed output (e.g., file, image file, video-frame, video file, bitstream) (block 150). Such output may be stored in a repository, or may be sent to one or more recipients, or may be served to one or more users via a server, or may be further processed or edited, or may be made available for one or more users for consumption, or may be transferred to other device or system for various purposes.

Referring now to the local content-type detection process of block 120, the media item (e.g., image, or video-frame) is scanned in accordance with a pre-defined directional route; for example, from top to bottom, and from left to right, on a pixel-by-pixel basis. For each pixel, a predictor residual value is calculated or computed or determined; for example, based on a gradient predictor of that pixel.

For example, a Gradient Predictor for a given pixel having coordinates (x, y), may be calculated as: a sum of a top-pixel value and a left-pixel value, minus the top-left pixel value.

For example, the Gradient Predictor may be calculated using the following formula:

$$\text{Gradient Predictor}(x,y) = \text{pixel}(x,y-1) + \text{pixel}(x-1,y) - \text{pixel}(x-1,y-1)$$

For example, the calculation of the Gradient Predictor may be demonstrated using the following table:

|   |   | X |   |
|---|---|---|---|
|   |   | − | + |
| Y |   | + |   |

For example, the Residual Predictor may then be calculated using the following formula:

$$\text{Residual Predictor}(x,y) = \text{pixel}(x-1,y) + \text{pixel}(x,y-1) - \text{pixel}(x-1,y-1) - \text{pixel}(x,y)$$

For example, the calculation of the Residual Predictor may be demonstrated using the following table:

|   |   | X |   |
|---|---|---|---|
|   |   | − | + |
| Y |   | + | − |

In some embodiments, each pixel may have multiple sample values; for example, each pixel may be an RGB pixel and thus may have a Red value, a Green value, and a Blue value. In such embodiments, the Gradient Predictor and the Residual Predictor may be calculated separately for each sample (e.g., calculating a Red sample Gradient Predictor and Residual Predictor; calculating a Green value Gradient Predictor and Residual Predictor; calculating a Blue value Gradient Predictor and Residual Predictor). Then, the multiple (e.g., three) predictor values may be converted into a single value per pixel; for example, by summing the three values, or by selecting the maximum value, by utilizing a particular weighted formula (e.g., assigning a greater weight, or a lower weight, to a particular type of sample); or otherwise aggregating the multiple values on a per-pixel basis.

The Residual Predictor value, or the aggregated Residual Predictor value, per each pixel, is then classified or categorized into one of two classes or categories: (i) photographic content, or (ii) non-photographic content. The classification may be based on one or more classification rules or classification conditions; for example, by comparing the Residual Predictor value (or its Absolute value) to a pre-defined threshold value, or to a pre-defined range-of-values, or by checking if the Residual Predictor value (or its Absolute value) is within a particular range-of values.

For example, in some embodiments, the pixel (x, y) is classified as a pixel having Photographic content, if the Absolute value of the Residual Predictor of that pixel, is greater than a first threshold value (Threshold1) and is also smaller than a second threshold value (Threshold2); otherwise, that pixel is classified as having Non-Photographic content.

In some embodiments, the values of the first threshold value (Threshold1), and the value of the second threshold value (Threshold2), may be selected or defined or configured such that, for example: Residual Predictor values that are below the first threshold value (Threshold1) correspond to well-predicted values; whereas, Residual Predictor values that are above the second threshold value (Threshold2) correspond to poorly-predicted values (e.g., strong edges of a visual element within an image or a video-frame).

In a demonstrative example, the image may be an 8-bit color image, such that each pixel has a value in the range of 0 to 255; and in some embodiments, for example, the first threshold value (Threshold1) may be defined as 3, and the second threshold value (Threshold2) may be defined as 40; and any pixel having an Absolute value of Residual Predictor that is greater than 3 and also smaller than 40 is classified as a pixel having Photographic content; whereas any pixel having an Absolute value of Residual Predictor that is not greater than 3 or is not smaller than 40 is classified as a pixel having Non-Photographic content.

In other embodiments, the method may assign continuous or non-discrete Residual Predictor values per pixel; for example, in an interval or a range of 0 to 1, based on a mapping of the Absolute value of the Residual Predictor per pixel.

The above-mentioned operations may result in a per-pixel estimate (or classification, or categorization) of the content type; such as, whether each pixel is associated with Photographic content or Non-Photographic content.

Referring now to the Segmentation step, the per-pixel estimates or classifications may be aggregated or collected or clustered or otherwise utilized for the purpose of determining or defining segments or regions of blocks, within the media item; such that each segment (or region, or block) comprises two or more pixels; and such that each segment (or region, or block) is classified or is categorized, in overhaul, as a Photographic segment (or region, or block) or as a Non-Photographic segment (or region, or block).

In some embodiments a segment (or region, or block) of a media item may be classified as having Photographic content, even if there is at least one pixel (or, even if there are some pixels) in said segment (or region, or block) which was (or were) classified as having Non-Photographic content.

In some embodiments a segment (or region, or block) of a media item may be classified as having Photographic content, if at least K percent of the total number of pixels in said segment (or region, or block) have been classified as having Photographic content. In some embodiments, K may be a threshold value, which may be hard-coded or pre-defined, or which may be configurable or may be modified to achieve particular implementation goals. In some embodiments, K may be, for example, 99 or 98 or 97 or 95 or 92 or 90 or 85 or 80 or 75 or 70 or 67 or 65 or 60 or 55 or 51 or 50 or other suitable value.

In some embodiments a segment (or region, or block) of a media item may be classified as having Non-Photographic content, even if there is at least one pixel (or, even if there are some pixels) in said segment (or region, or block) which was (or were) classified as having Photographic content.

In some embodiments a segment (or region, or block) of a media item may be classified as having Non-Photographic content, if at least N percent of the total number of pixels in said segment (or region, or block) have been classified as having Non-Photographic content. In some embodiments, N may be a threshold value, which may be hard-coded or pre-defined, or which may be configurable or may be modified to achieve particular implementation goals. In some embodiments, N may be, for example, 99 or 98 or 97 or 95 or 92 or 90 or 85 or 80 or 75 or 70 or 67 or 65 or 60 or 55 or 51 or 50 or other suitable value.

In some embodiments, the determining or the defining of a segment (or block, or region), or the clustering of aggregating of multiple pixels into a unified segment (or block, or region) may be performed by utilizing one or more of the following demonstrative operations or processes, which may operate on the per-pixel estimates or classifications values of pixels: (a) applying one or more morphological operations, such as dilation, erosion, closure or opening; (b) applying a median filter, or other non-linear filter, or a linear filter, and/or one or more noise reduction methods or de-noising methods (e.g., wavelet transform; statistical methods); (c) detection of rectangles, squares, circles, ovals, ellipses, triangles, and/or distinct polygons or polygonal shapes or other plausible shapes, optionally turning the classification of all the pixels in that shape into the class value (Photographic or Non-Photographic) that is the most dominant in that shape; (d) aggregation of the per-pixel values per block, such as, by defining a particular block size (e.g., 32×32 pixels), and averaging and thresholding the per-pixel values per each such block; and optionally, such blocks may correspond to a codec-dependent macroblocks, and/or may correspond to (or may have) block size and/or block dimensions that are particularly efficient for processing by a particular processor/GPU/CPU/MCU; (e) applying one or more statistical operations, such as average or mean, median, or a weighted formula, to generate a single classification value (Photographic or Non-Photographic) that represents a plurality of pixels; (f) applying one or more methods that find and/or sharpen edges or contours of an object within an image or a video-frame; (g) applying a computer vision or computerized vision method, or a Machine Learning (ML) or Deep Learning (DL) or Artificial Intelligence (AI) unit, to determine or to estimate that a particular region in the media item is associated with a Photographic element (e.g., a photograph of a tiger) or conversely with a non-photographic element (e.g., a textual logo); (h) applying comparison techniques, to determine that a particular portion or segment or block of the image or video-frame or media item is Photographic or is Non-Photographic; (i) performing a reverse image search process on the entirety of the media item or on portions or regions thereof (e.g., on quarters thereof, or halves thereof, or the like), and analyzing the reverse image search results, to determine that a particular portion matches an element that is known to be Photographic (e.g., a photograph of the Queen of England) or that is known to be Non-Photographic (e.g., a four-color image of Donald Duck); (j) applying one or more techniques for aggregating or clustering pixels based on (or, by taking into account) one or more other features or properties or parameters or characteristics (e.g., brightness, contrast, hue, saturation, or the like).

The aggregation or segmentation or clustering process may result in a homogenized map or a segmentation map, which describes or indicates the various types of content-type elements that were determined to exist in the media item (e.g., image, video-frame), and their locations (e.g., coordinates) within such media item. As mentioned before, the demonstrative example discussed above and/or herein relates to classification of content into two content-types; but in some embodiments, more than two content-types may be used.

The segmentation map is then used for segmenting the image or the video-frame or the media item into segments or blocks or regions; and/or for selecting which codec or encoding technique or compression technique to apply for each such segment or block; and/or for determining compression coefficients and/or compression coefficients; and/or while also taking into account (or based on) bitstream capabilities of the selected codec(s) or multi-codec format.

For example, in some embodiments, if all of the media item belongs to the same content-type, then a single codec or encoding technique or compression technique may be selected and may be applied on the entirety of the media item; for example, selecting to apply JPEG encoding for an image that is determined to be (in its entirety) Photographic content, or selecting to apply PNG encoding for an image that is determined to be (in its entirety) Non-Photographic content.

In some embodiments, if at least M percent of the area of the media item is classified as Photographic, then an entirety of that media item is also classified as Photographic; and the method may select a single codec or encoding technique or compression technique that are pre-defined as suitable for Photographic content (e.g., JPEG encoding). In some embodiments, M may be a threshold value, which may be hard-coded or pre-defined, or which may be configurable or may be modified to achieve particular implementation goals. In some embodiments, M may be, for example, 99 or 98 or 97 or 95 or 92 or 90 or 85 or 80 or 75 or other suitable value.

In some embodiments, the ratio between (i) the area of the media item that is classified as Photographic, and (ii) the entirety of the area of the media item, may be denoted Ratio-P. In some embodiments, if Ratio-P is greater than a particular threshold value, then a particular single codec or encoding technique or compression technique; for example, selecting JPEG encoding if Ratio-P is greater than 0.75. In some embodiments, one or more encoding/compression coefficients or parameters may be configured or selected, based on the value of Ratio-P; for example, selecting to apply a Discrete Cosine Transform (DCT) coefficient quantization that corresponds to quality setting 95 if Ratio-P is greater than 0.90; and selecting to apply a DCT coefficient quantization that corresponds to quality setting 87 if Ratio-P is smaller than or equal to 0.90 (and is greater than 0.75 as mentioned above). This is only a demonstrative non-limiting example.

In some embodiments, if at least R percent of the area of the media item is classified as Non-Photographic, then an entirety of that media item is also classified as Non-Photographic; and the method may select a single codec or encoding technique or compression technique that are pre-defined as suitable for Non-Photographic content (e.g., GIF encoding). In some embodiments, R may be a threshold value, which may be hard-coded or pre-defined, or which may be configurable or may be modified to achieve particular implementation goals. In some embodiments, R may be, for example, 99 or 98 or 97 or 95 or 92 or 90 or 85 or 80 or 75 or other suitable value.

In some embodiments, the ratio between (i) the area of the media item that is classified as Non-Photographic, and (ii) the entirety of the area of the media item, may be denoted Ratio-N. In some embodiments, if Ratio-N is greater than a particular threshold value, then a particular single codec or encoding technique or compression technique; for example, selecting PNG encoding if Ratio-N is greater than 0.77. In some embodiments, one or more encoding/compression coefficients or parameters may be configured or selected, based on the value of Ratio-N; for example, selecting to apply PNG-8 encoding (supporting up to 256 colors) if Ratio-N is greater than 0.89; and selecting to apply PNG-24 encoding (supporting up to 16,777,216 colors) if Ratio-N is smaller than or equal to 0.84 (and is greater than 0.77 as mentioned above). This is only a demonstrative non-limiting example.

In some embodiments, a multiple-codec approach may be used, such that two or more different codecs or encoding techniques or compression techniques are selected and are applied to two different segments (or blocks, or regions) of the same single image or video-frame or media item. For example, in some embodiments, data of a single image or a single video-frame may be split or divided into two or more layers; wherein each layer has a uniform content-type or content-class (e.g., Photographic, or Non-Photographic); and such that each layer is encoded or compressed using a particular codec or encoding technique or compression technique, and optionally, wherein each such layer may be encoded or compressed using a particular set of encoding/compression parameters or coefficients. For example, a first layer of a single image or video-frame may include only the Photographic segment(s) that were found in that media item; and such first layer may be encoded using JPEG (as an example), or using a DCT-based encoding/compression technique; whereas, a second layer of that same single image or video-frame may include only the Non-Photographic segment(s) that were found in that media item, and such second layer may be encoded using Lossless PNG (as an example) or using a lossless or near-lossless encoding/compression technique.

In other embodiments, the entirety of the image or video-frame or media item may be encoded or compressed as a single layer, even if two classes of content were identified; yet the method may inform or may notify, to the applicable codec or encoding/compression tool, about the segmentation map which provides mapping data about the content-types or content-classes that were identified and their location (e.g., coordinates) within the media item. Based on such segmentation map data, the method may encode Photographic blocks using a first encoding/compression technique (e.g., a DCT-based encoding technique), and may encode Non-Photographic blocks of the same media item using a second, different, encoding/compression technique (e.g., performing color quantization and encoded using a palette-based technique or an indexed-colors technique).

In some embodiments, additionally or alternatively, the content-type segmentation map may be utilized to inform or to notify or to select other encoding/compression related choices or options or parameters or coefficients; for example, to select bitstream ordering (e.g., for progressive decoding, such that textual content may become legible earlier in time); to select a quality setting (e.g., selecting a higher quality target for Non-Photographic regions relative to Photographic regions); or other parameters.

Figure 2A:
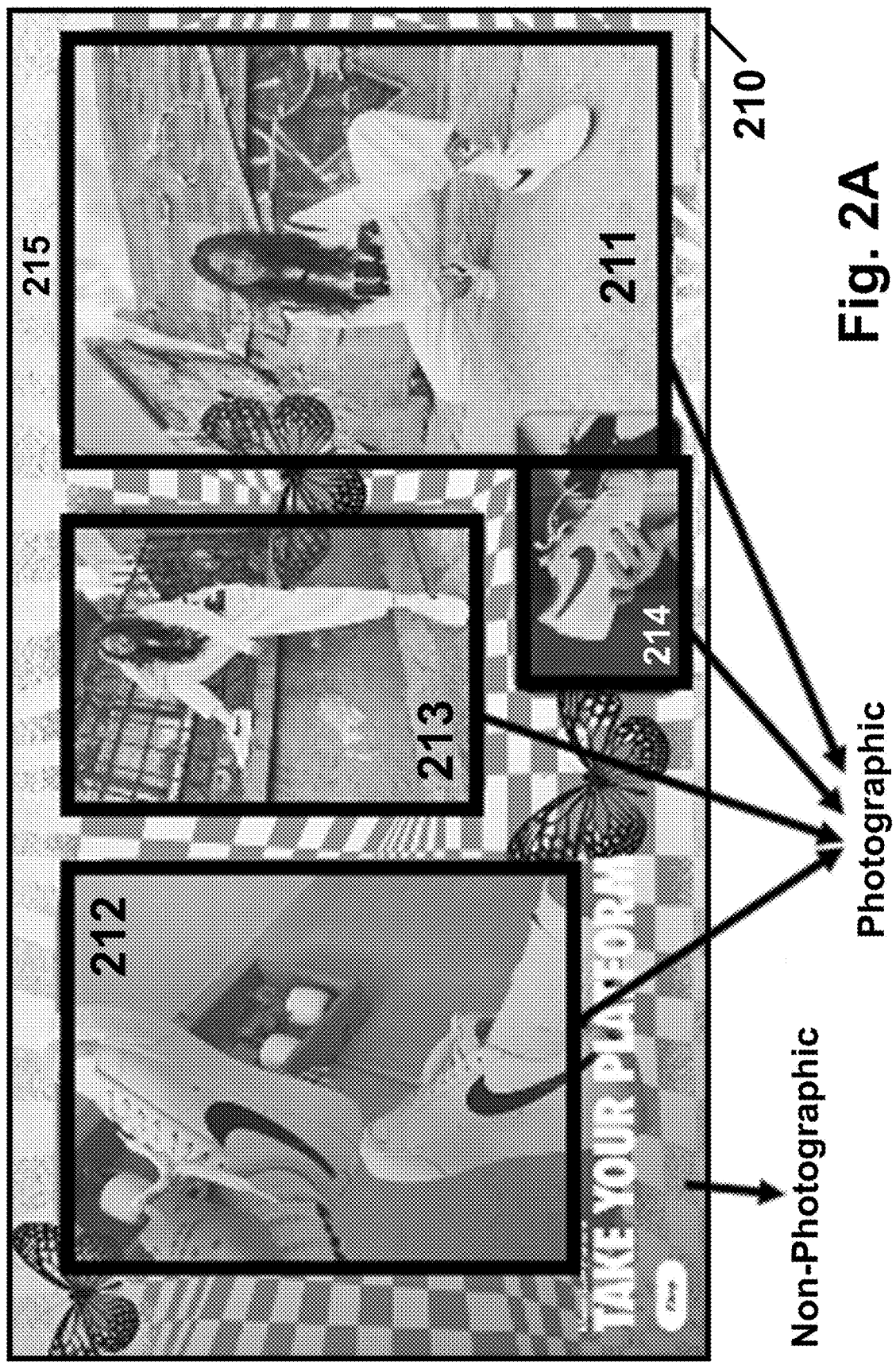
FIGS. 2A to 2C are illustrations of media items as processed in accordance with some demonstrative embodiments.
Figure 2B:
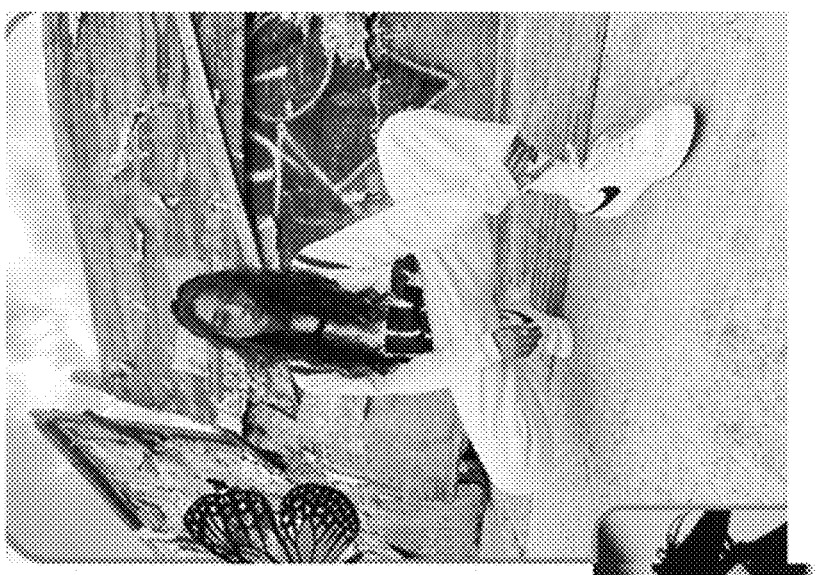
Figure 2B:
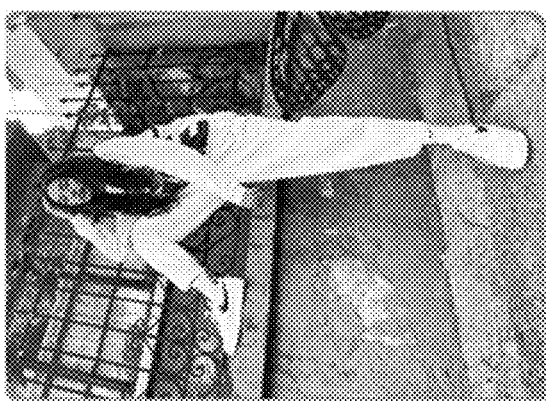
Figure 2B:
Figure 2B:
Figure 2C:
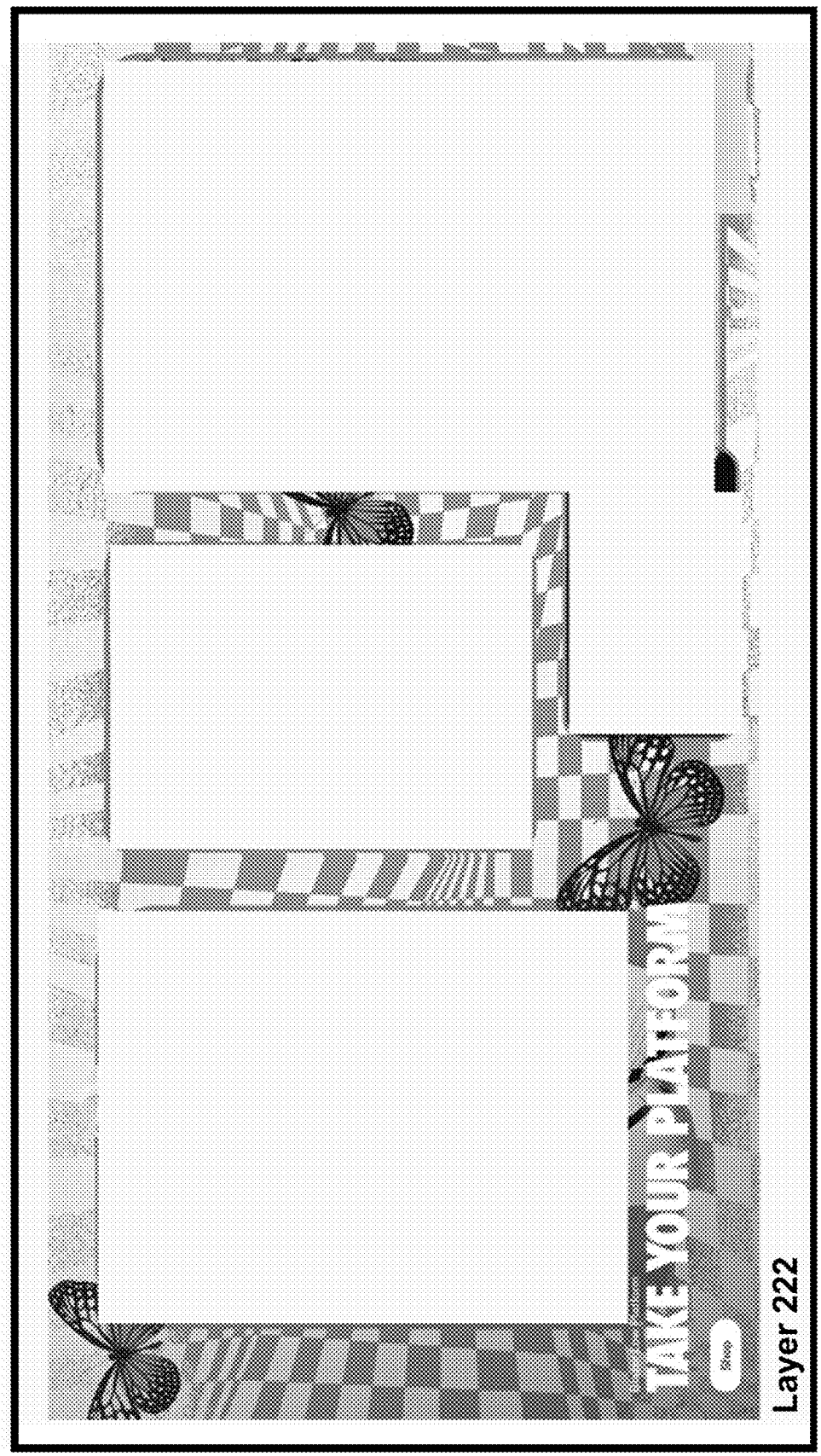

Reference is made to FIGS. 2A to 2C, which are illustrations of media items as processed in accordance with some demonstrative embodiments. FIG. 2A shows a composed image 210, such as a single image or a single video-frame. It may be observed that the composed image 210 includes several regions or segments (211-214) that visually appear Photographic; and also includes other regions (e.g., background region 215) that visually appear Non-Photographic. The method of some embodiments may detect and may determine that the composed image 210 includes, for example, four Photographic segments 211-214 (or blocks, or segments, or regions); and also includes a Non-Photographic segment 215.

In some embodiments, a segmentation map may be generated to indicate the location of the four Photographic segments 211-214, and to indicate that the remainder of the composed image 210 is a Non-Photographic segment 215.

In some embodiments, optionally, a first layer 221 may be generated to include therein only the Photographic segments of the composed image; and such first layer is then encoded/compressed using a first encoding/compression technique; and such first layer 221 is demonstrated in FIG. 2B. Similarly, a second layer 222 may be generated to include therein only the Non-Photographic segments of the composed image; and such second layer is then encoded/compressed using a second, different, encoding/compression technique; and such second layer 222 is demonstrated in FIG. 2C. As a non-limiting example, the second layer 222 includes a background illustration, and the first layer 221 includes several photographic elements in the foreground; other suitable combinations or compositions may be detected and mapped.

In some embodiments, optionally, in the process of generating or creating from a source image the layer(s) for a composed image, the system may replace portions or segments or some pixel-clusters of the source image with white pixels or with black pixels or with uniform-color pixels. For example, in order to generate the Non-Photographic layer 222 from the source image 210, the Photographic Content segments 211-214 of the source image 210 may be replaced with white filled-out rectangles, thereby leaving the surroundings of those rectangles as the actual content of the Non-Photographic layer 222. Similarly, in order to generate the Photographic layer 221 from the source image 210, the Non=Photographic Content that surrounds the Photographic segments 211-214 of the source image 210 may be replaced with white filled-out rectangles or polygons, thereby leaving the segments 211-214 as the actual content of the Photographic layer 222.

In some embodiments, optionally, more than two layers may be used or may be generated to represent a single image or a single video-frame or a composed media item. For example: (I) Layer 1 may correspond to a first particular Photographic segment of the composed media item, and it may be encoded/compressed using Encoding/Compression Technique 1, and/or using Set-1 of encoding/compression coefficients or parameters; (II) Layer 2 may correspond to a second particular Photographic segment of the composed media item, and it may be encoded/compressed using Encoding/Compression Technique 2, and/or using Set-2 of encoding/compression coefficients or parameters; (III) Layer 3 may correspond to a first particular Non-Photographic segment of the composed media item, and it may be encoded/compressed using Encoding/Compression Technique 3, and/or using Set-3 of encoding/compression coefficients or parameters; (IV) Layer 4 may correspond to a second particular Non-Photographic segment of the composed media item, and it may be encoded/compressed using Encoding/Compression Technique 4, and/or using Set-3 of encoding/compression coefficients or parameters; and so forth.

Figure 3:
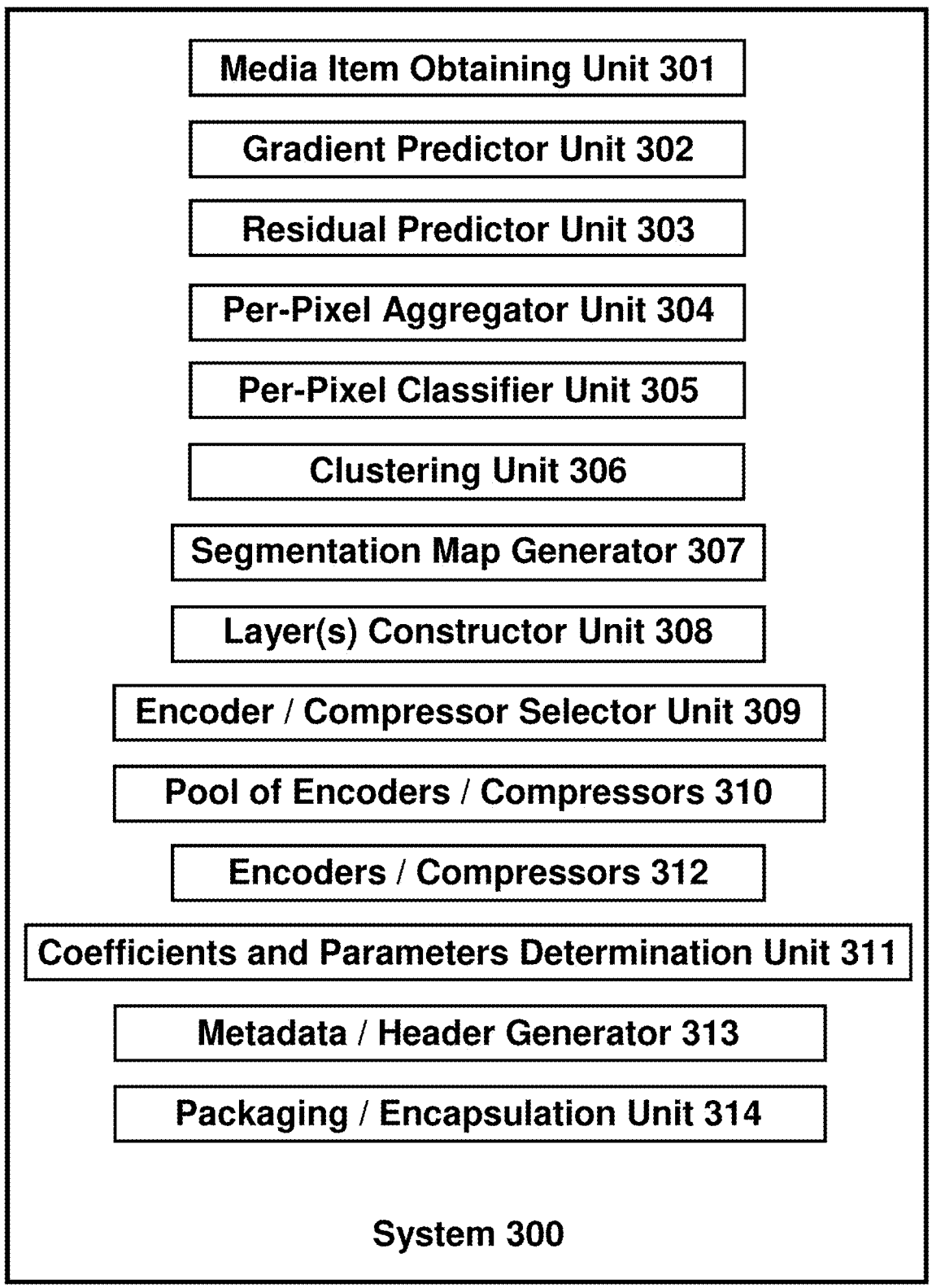
FIG. 3 is a schematic block-diagram illustration of a system, in accordance with some demonstrative embodiments.

Reference is made to FIG. 3, which is a schematic block-diagram illustration of a system 300, in accordance with some demonstrative embodiments. System 300 may include, for example, a Media Item Obtaining Unit 301, configured to obtain or receive or extract a Media Item that is intended for further processing. A Gradient Predictor Unit 302 may determine a Gradient Predictor value for each pixel of the Media Item; and a Residual Predictor Unit 303 may determine a Residual Predictor value for each pixel of the Media Item. Optionally, a Per-Pixel Aggregator Unit 304 may aggregate multiple values that are associated with each pixel, for example, if such multiple values were determined based on different properties of each pixel (e.g., three values corresponding to RGB properties). A Per-Pixel Classifier Unit 305 then operates to classify or to categorize, on a per-pixel basis, each pixel as either having Photographic content or having Non-Photographic content.

A Clustering Unit 306 may cluster together two or more pixels in a cluster or block or segment or region, that is defined in its entirety as Photographic; even if some of the pixels (e.g., a minority of the pixels) in that cluster or block or segment or region have been individually classified as having Non-Photographic content. Similarly, Clustering Unit 306 may cluster together two or more pixels in a cluster or block or segment or region, that is defined in its entirety as Non-Photographic; even if some of the pixels (e.g., a minority of the pixels) in that cluster or block or segment or region have been individually classified as having Photographic content. A Segmentation Map Generator 307 generates a map or other suitable representation (e.g., a list, a dataset, a table, or the like), indicating the content-class and the location of each such segment or block or region or cluster.

Optionally, a Layer(s) Constructor Unit 308 may generate two or more layers that correspond to the Media Item. For example, in some embodiments, a first layer may include all the segments determined to be Photographic segments, and only those segments; whereas, a second layer may include only the segments determined to be Non-Photographic segments, and only those segments. In other embodiments, three or more layers may be defined or generated; for example, each layer corresponding to a single segment, or to two or more particular segments of the same content-type or content-class.

An Encoder/Compressor Selector Unit 309 may select a particular encoder/compressor (or a particular encoding/compression technique) that will encode/compress each layer, or each segment (or block, or region); from a Pool of Encoders/Compressors 310 that are available or relevant to this Media Item. Optionally, an Encoding/Compressions Coefficients and Parameters Determination Unit 311 may define or determine or configure a particular set of encoding/compression coefficients or parameters, for each such layer or for each such segment (or block, or region). One or more Encoders/Compressors 312 are then activated, in series or in parallel, to perform the relevant encoding/compression operations. Optionally, a Metadata/Header Generator 313 may construct a header and/or metadata that represents some or all of the above-mentioned information, such as the various detected segments and their locations, as well as the encoding/compression technique used for each such segment or layer; as such metadata and/or header information may be used by a unit or device that consumes the composed Media Item, or that will subsequently decode/decompress the composed Media Item and reconstruct from it the composed Media Item, for playback or consumption. Optionally, a Packaging/Encapsulation Unit 314 may generate a file or a data item or a single container, which includes therein the digital representations of the various layer(s) and/or segments and/or content-regions or content-portions, as well as the segmentation map information and/or other metadata; and such file or data item or container may be stored, transmitted, or otherwise processed by the same system 300 or by other systems or units or end-user devices.

In accordance with some embodiments, a single container and/or a single file can be used to represent and/or to carry inside it two or more components (or layers, or regions, or portions) of a composite image, including the Photographic layer(s) or region(s) and the Non-Photographic layer(s) or region(s); for example, implemented by utilizing a single Portable Document Format (PDF) file or container, or a single Scalable Vector Graphics (SVG) file or container, or a single High Efficiency Image File Format (HEIF) file or container, or other type of a single file or a single container that can support two or more encoding (or compression) techniques that are implemented with regard to content-portions or content-layers of a single image. Some embodiments may thus operate to perform image encoding in a content-aware manner, by selecting the most suitable single media format that would store the composite image, and by compositing a plurality of encoding formats that encode image-portions or image-layers of a single image into a single container (e.g., SVG or PDF or HEIF, or other container that can contain multiple payload codecs or multiple payload-contents that are encoded separately by two or more different encoding techniques), and by selecting the coding techniques and parameters per image-region within an expressive format that can achieve the most efficient performance goals for each content type (e.g., to select an encoding technique that supports macroblocks or layering, such as JXL JPEG XL encoding, or AVIF or AV1 encoding).

For example, in some embodiments, the system or an encoder unit, or a transcoder or a format converter unit or an image editing unit, may select the most suitable single container for the composite image, based on the number and/or types and/or locations and/or offsets of the Photographic content regions/layers and the Non-Photographic content regions/layers; and may further select, from a pool of available encoding techniques and/or encoding parameters or coefficients, the particular set of techniques and/or parameters and/or coefficients for each particular Photographic content region/layer and for each particular Non-Photographic content region/layer.

In some embodiments, the system or an encoder unit, or a transcoder or a format converter unit or an image editing unit, may analyze the content of a source image; and may determine one or more image-portions or image-regions or image-layers that have Photographic content; and may determine one or more image-portions or image-regions or image-layers that have Non-Photographic content; and may then select, for example, Lossy Encoding Technique 1 (such as JPEG encoding that utilizes DCT coefficient quantization that corresponds to quality setting 95) for encoding Photographic Region (or Layer) 1 of the image; and may select Lossy Encoding Technique 2 (such as JPEG encoding that utilizes DCT coefficient quantization that corresponds to quality setting 74) for encoding Photographic Region (or Layer) 2 of the image; and may select Lossless Encoding Technique 1 (such as PNG-8 having up to 256 colors) for encoding Non-Photographic Region (or Layer) 1 of the image; and may select Lossless Encoding Technique 2 (such as PNG-24 having up to 16,777,216 colors) for encoding Non-Photographic Region (or Layer) 2 of the image; and may create a single composite image, that is stored within a single container, having those four regions (or layers) that were encoded via a content-aware method with those four different techniques.

In some embodiments, some or all of the components of System 300 may be implemented as part of a computerized device capable of creating media items and/or editing media items and/or storing media items and/or serving media items and/or performing playback of media items and/or consuming media items. Some embodiments may be used in conjunction with Media Items intended for a smartphone, a tablet, a laptop computer, a desktop computer, a smartwatch, a wearable device, an Augmented Reality (AR) helmet or headset or glasses or gear, a Virtual Reality (VR) helmet or headset or glasses or gear, a smart television, a smart display unit, an Internet connected display unit, or dedicated video playback device, or the like. Some embodiments may be implemented using a server computer, a cloud-based server or computer or repository, a Web server, an applications server, a database of media items, a media streaming server, or the like.

Some embodiments may be implemented as, or by using, a stand-alone device or unit, a converter unit, an image converter unit, a video converter unit, a media converter unit, a transcoder, a re-encoder, a decoder-and-encoder unit, or other suitable device. Some embodiments may be utilized as, or by using, a browser extension or add-on or plug-in, or a stand-alone application or "app" or mobile app, or as a native application, or as an application running inside a browser or inside a virtual machine, or as a cloud-computing application or as a cloud-based application; which may receive (or obtain, or download) as input, one or more images or video frames or videos or other media content; and which generates (or uploads, or creates) as output, one or more modified or composite or hybrid files or images or media items or videos.

Some embodiments include a method comprising: (a) receiving a source image, wherein the source image is one of: (i) an image file, (ii) a frame of a video; (b) analyzing content of the source image, on a pixel-by-pixel basis; and classifying each pixel in the source image as either (I) a pixel associated with Photographic content, or (II) a pixel associated with Non-Photographic content; (c) generating a pixel-clusters map that indicates (i) one or more clusters of pixels that were classified as associated with Photographic content of said source image, and (ii) one or more clusters of pixels that were classified as associated with Non-Photographic content of said source image; (d) generating a composed image, by: (d1) applying a first encoding technique to encode at least one of the clusters of pixels that were classified as associated with Photographic content of said source image; (d2) applying a second, different, encoding technique to encode at least one of the clusters of pixels that were classified as associated with Non-Photographic content of said source image; wherein the method is implemented by utilizing at least a hardware processor.

In some embodiments, step (b) comprises: (b1) determining a gradient predictor for each pixel of said source image, based on gradient values of at least two neighboring pixels of said pixel; (b2) determining a residual gradient predictor for each pixel of said source image, based on (I) the gradient predictor determined in step (b1) for said pixel, and (I) a gradient value of said pixel.

In some embodiments, step (b1) and step (b2) are performed separately for each color channel of said pixel; and the method further comprises: (b3) aggregating, on a per-pixel basis, values of residual gradient predictors that were determined separately for each color channel of said pixel, into an aggregated value of residual gradient predictor per pixel of said source image.

In some embodiments, the method further comprises: (b4) if the aggregated value of residual gradient predictor of a particular pixel, is within a pre-defined range of values, then: determining that said particular pixel is associated with Photographic content; otherwise, determining that said particular pixel is associated with Non-Photographic content.

In some embodiments, generating the pixel-clusters map of step (c) comprises: defining a first particular cluster of pixels as a pixels-cluster having Photographic content, if at least N percent of the pixels in said first particular cluster were classified as associated with Photographic content, even if one or more pixels in said first particular cluster were classified as associated with Non-Photographic content; wherein N is a pre-defined threshold value; defining a second particular cluster of pixels as a pixels-cluster having Non-Photographic content, if at least M percent of the pixels in said second particular cluster were classified as associated with Non-Photographic content, even if one or more pixels in said second particular cluster were classified as associated with Photographic content; wherein M is a pre-defined threshold value; wherein N is a pre-defined threshold value or a configurable threshold value, or a dynamically-determined threshold value; wherein N is a pre-defined threshold value; wherein N is a pre-defined threshold value or a configurable threshold value, or a dynamically-determined threshold value.

In some embodiments, the method comprises: applying the first encoding technique to said first particular cluster, that was defined as having Photographic content, even if one or more pixels in said first particular cluster were classified as associated with Non-Photographic content; applying the second, different, encoding technique to said second particular cluster, that was defined as having Non-Photographic content, even if one or more pixels in said second particular cluster were classified as associated with Non-Photographic content.

In some embodiments, the method comprises: generating a first image-layer, that is composed of only pixel-clusters of the source image that were determined to be pixel-clusters associated with Photographic content; generating a second image-layer, that is composed of only pixel-clusters of the source image that were determined to be pixel-clusters associated with Non-Photographic content.

In some embodiments, the method comprises: applying the first encoding technique to said first image-layer that is composed of only pixel-clusters of the source image that were determined to be pixel-clusters associated with Photographic content; applying the second, different, encoding technique to said second image-layer that is composed of only pixel-clusters of the source image that were determined to be pixel-clusters associated with Non-Photographic content.

In some embodiments, the method comprises: generating a composed image which comprises at least: (i) the first image-layer that is composed of only pixel-clusters of the source image that were determined to be pixel-clusters associated with Photographic content; (ii) the second image-layer that is composed of only pixel-clusters of the source image that were determined to be pixel-clusters associated with Non-Photographic content; (iii) metadata or header data, that indicates the number of layers of said composed image, and the type of encoding technique that was used to encode each layer of said composed image.

In some embodiments, (I) the first encoding technique, that is used to encode at least one of the clusters of pixels that were classified as associated with Photographic content of said source image, and (II) the second encoding technique, that is used to encode at least one of the clusters of pixels that were classified as associated with Non-Photographic content of said source image, utilize a same encoding scheme but differ by utilized different values of encoding coefficients.

In some embodiments, differentiating between (i) a first group of pixels of the source image that is associated with Photographic content, and (ii) a second groups of pixels of the source image that is associated with Non-Photographic content, is based, at least partially, on per-pixel calculations of color gradient values of each pixel of said source image.

In some embodiments, differentiating between (i) a first group of pixels of the source image that is associated with Photographic content, and (ii) a second groups of pixels of the source image that is associated with Non-Photographic content, is based, at least partially, on a reverse image search that determines a match between (I) a particular group of pixels in said source image, and (II) an external image that is known to have Photographic content or that is known to have Non-Photographic content.

In some embodiments, generating the composed image in step (d) comprises: selecting, from a pool of available encoding techniques, a lossy encoding technique that is utilized as said first encoding technique to perform lossy encoding of at least one of the clusters of pixels that were classified as associated with Photographic content of said source image; selecting, from said pool of available encoding techniques, a lossless encoding technique that is utilized as said second, different, encoding technique to perform lossless encoding of at least one of the clusters of pixels that were classified as associated with Non-Photographic content of said source image.

In some embodiments, generating the composed image further comprises: placing within a single container file, that carries all payloads of said composed image, both (I) lossy-encoded image-data that was utilized as said first encoding technique to perform lossy encoding of at least one of the clusters of pixels that were classified as associated with Photographic content of said source image, and (II) lossless-encoded image-data that was utilized as said second encoding technique to perform lossless encoding of at least one of the clusters of pixels that were classified as associated with Non-Photographic content of said source image.

In some embodiments, generating the composed image further comprises: placing within a single container file, that carries all payloads of said composed image, both (I) image-data of pixel clusters of Photographic content that were encoded with said first encoding technique, and (II) image-data of pixel clusters of Non-Photographic content that were encoded with said second encoding technique.

In some embodiments, the placing further comprises: selecting a particular type of container, from a pool of available container types, based on analysis of content of the source image and based on determination of Non-Photographic content pixel clusters and Photographic content pixel clusters.

Some embodiments include a non-transitory storage medium or storage article having stores thereon instructions that, when executed by a machine, cause the machine to perform a method as described.

Some embodiments include a system comprising: one or more hardware processors, that are configured to execute code, and that are operably associated with one or more memory units that are configured to store code; wherein the one or more hardware processors are configured to perform a method as described.

In some embodiments, in order to perform the computerized operations described above, the relevant system or devices may be equipped with suitable hardware components and/or software components; for example: a processor able to process data and/or execute code or machine-readable instructions (e.g., a central processing unit (CPU), a graphic processing unit (GPU), a digital signal processor (DSP), a processing core, an Integrated Circuit (IC), an Application-Specific IC (ASIC), one or more controllers, a logic unit, or the like); a memory unit able to store data for short term (e.g., Random Access Memory (RAM), volatile memory); a storage unit able to store data for long term (e.g., non-volatile memory, Flash memory, hard disk drive, solid state drive, optical drive); an input unit able to receive user's input (e.g., keyboard, keypad, mouse, touch-pad, touch-screen, trackball, microphone); an output unit able to generate or produce or provide output (e.g., screen, touch-screen, monitor, display unit, audio speakers); one or more transceivers or transmitters or receivers or communication units (e.g., Wi-Fi transceiver, cellular transceiver, Bluetooth transceiver, wireless communication transceiver, wired transceiver, Network Interface Card (NIC), modem); and other suitable components (e.g., a power source, an Operating System (OS), drivers, one or more applications or "apps" or software modules, or the like).

In accordance with embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   (a) receiving a source image, wherein the source image is one of: (i) an image file, (ii) a frame of a video;
   (b) analyzing content of the source image, on a pixel-by-pixel basis; and classifying each pixel in the source image as either (I) a pixel associated with Photographic content, or (II) a pixel associated with Non-Photographic content;
   (c) generating a pixel-clusters map that indicates (i) one or more clusters of pixels that were classified as associated with Photographic content of said source image, and (ii) one or more clusters of pixels that were classified as associated with Non-Photographic content of said source image;
   (d) generating a composed image, by:
   (d1) applying a first encoding technique to encode at least one of the clusters of pixels that were classified as associated with Photographic content of said source image;
   (d2) applying a second, different, encoding technique to encode at least one of the clusters of pixels that were classified as associated with Non-Photographic content of said source image;
   wherein the method is implemented by utilizing at least a hardware processor.

2. The method of claim 1,
   wherein step (b) comprises:
   (b1) determining a gradient predictor for each pixel of said source image, based on gradient values of at least two neighboring pixels of said pixel;
   (b2) determining a residual gradient predictor for each pixel of said source image, based on (I) the gradient predictor determined in step (b1) for said pixel, and (I) a gradient value of said pixel.

3. The method of claim 2,
   wherein step (b1) and step (b2) are performed separately for each color channel of said pixel; and further comprising:
   (b3) aggregating, on a per-pixel basis, values of residual gradient predictors that were determined separately for each color channel of said pixel, into an aggregated value of residual gradient predictor per pixel of said source image.

4. The method of claim 3, further comprising:
   (b4) if the aggregated value of residual gradient predictor of a particular pixel, is within a pre-defined range of values, then: determining that said particular pixel is associated with Photographic content; otherwise, determining that said particular pixel is associated with Non-Photographic content.

5. The method of claim 4,
   wherein generating the pixel-clusters map of step (c) comprises:
   defining a first particular cluster of pixels as a pixels-cluster having Photographic content, if at least N percent of the pixels in said first particular cluster were classified as associated with Photographic content, even if one or more pixels in said first particular cluster were classified as associated with Non-Photographic content; wherein N is a pre-defined threshold value;
   defining a second particular cluster of pixels as a pixels-cluster having Non-Photographic content, if at least M percent of the pixels in said second particular cluster were classified as associated with Non-Photographic content, even if one or more pixels in said second particular cluster were classified as associated with Photographic content; wherein M is a pre-defined threshold value.

6. The method of claim 5, comprising:
   applying the first encoding technique to said first particular cluster, that was defined as having Photographic content, even if one or more pixels in said first particular cluster were classified as associated with Non-Photographic content;
   applying the second, different, encoding technique to said second particular cluster, that was defined as having Non-Photographic content, even if one or more pixels in said second particular cluster were classified as associated with Non-Photographic content.

7. The method of claim 1, comprising:
   generating a first image-layer, that is composed of only pixel-clusters of the source image that were determined to be pixel-clusters associated with Photographic content;

generating a second image-layer, that is composed of only pixel-clusters of the source image that were determined to be pixel-clusters associated with Non-Photographic content.

8. The method of claim 7, comprising:
applying the first encoding technique to said first image-layer that is composed of only pixel-clusters of the source image that were determined to be pixel-clusters associated with Photographic content;
applying the second, different, encoding technique to said second image-layer that is composed of only pixel-clusters of the source image that were determined to be pixel-clusters associated with Non-Photographic content.

9. The method of claim 8, comprising:
generating a composed image which comprises at least:
(i) the first image-layer that is composed of only pixel-clusters of the source image that were determined to be pixel-clusters associated with Photographic content;
(ii) the second image-layer that is composed of only pixel-clusters of the source image that were determined to be pixel-clusters associated with Non-Photographic content;
(iii) metadata or header data, that indicates the number of layers of said composed image, and the type of encoding technique that was used to encode each layer of said composed image.

10. The method of claim 1,
wherein (I) the first encoding technique, that is used to encode at least one of the clusters of pixels that were classified as associated with Photographic content of said source image, and (II) the second encoding technique, that is used to encode at least one of the clusters of pixels that were classified as associated with Non-Photographic content of said source image, utilize a same encoding scheme but differ by utilized different values of encoding coefficients.

11. The method of claim 1,
wherein differentiating between (i) a first group of pixels of the source image that is associated with Photographic content, and (ii) a second groups of pixels of the source image that is associated with Non-Photographic content, is based, at least partially, on per-pixel calculations of color gradient values of each pixel of said source image.

12. The method of claim 1,
wherein differentiating between (i) a first group of pixels of the source image that is associated with Photographic content, and (ii) a second groups of pixels of the source image that is associated with Non-Photographic content, is based, at least partially, on a reverse image search that determines a match between (I) a particular group of pixels in said source image, and (II) an external image that is known to have Photographic content or that is known to have Non-Photographic content.

13. The method of claim 1,
wherein generating the composed image in step (d) comprises:
selecting, from a pool of available encoding techniques, a lossy encoding technique that is utilized as said first encoding technique to perform lossy encoding of at least one of the clusters of pixels that were classified as associated with Photographic content of said source image;
selecting, from said pool of available encoding techniques, a lossless encoding technique that is utilized as said second, different, encoding technique to perform lossless encoding of at least one of the clusters of pixels that were classified as associated with Non-Photographic content of said source image.

14. The method of claim 13,
wherein generating the composed image further comprises:
placing within a single container file, that carries all payloads of said composed image, both (I) lossy-encoded image-data that was utilized as said first encoding technique to perform lossy encoding of at least one of the clusters of pixels that were classified as associated with Photographic content of said source image, and (II) lossless-encoded image-data that was utilized as said second encoding technique to perform lossless encoding of at least one of the clusters of pixels that were classified as associated with Non-Photographic content of said source image.

15. The method of claim 13,
wherein generating the composed image further comprises:
placing within a single container file, that carries all payloads of said composed image, both (I) image-data of pixel clusters of Photographic content that were encoded with said first encoding technique, and (II) image-data of pixel clusters of Non-Photographic content that were encoded with said second encoding technique.

16. The method of claim 15,
wherein the placing further comprises:
selecting a particular type of container, from a pool of available container types, based on analysis of content of the source image and based on determination of Non-Photographic content pixel clusters and Photographic content pixel clusters.

17. A non-transitory storage medium having stores thereon instructions that, when executed by a machine, cause the machine to perform a method comprising:
(a) receiving a source image, wherein the source image is one of: (i) an image file, (ii) a frame of a video;
(b) analyzing content of the source image, on a pixel-by-pixel basis; and classifying each pixel in the source image as either (I) a pixel associated with Photographic content, or (II) a pixel associated with Non-Photographic content;
(c) generating a pixel-clusters map that indicates (i) one or more clusters of pixels that were classified as associated with Photographic content of said source image, and (ii) one or more clusters of pixels that were classified as associated with Non-Photographic content of said source image;
(d) generating a composed image, by:
(d1) applying a first encoding technique to encode at least one of the clusters of pixels that were classified as associated with Photographic content of said source image;
(d2) applying a second, different, encoding technique to encode at least one of the clusters of pixels that were classified as associated with Non-Photographic content of said source image.

18. The non-transitory storage medium of claim 17, wherein step (b) comprises:
(b1) determining a gradient predictor for each pixel of said source image, based on gradient values of at least two neighboring pixels of said pixel;
(b2) determining a residual gradient predictor for each pixel of said source image, based on (I) the gradient predictor determined in step (b1) for said pixel, and (I) a gradient value of said pixel.

19. A system comprising:

one or more hardware processors, that are configured to execute code, and that are operably associated with one or more memory units that are configured to store code, wherein the one or more hardware processors are configured to perform:

(a) receiving a source image, wherein the source image is one of: (i) an image file, (ii) a frame of a video;

(b) analyzing content of the source image, on a pixel-by-pixel basis; and classifying each pixel in the source image as either (I) a pixel associated with Photographic content, or (II) a pixel associated with Non-Photographic content;

(c) generating a pixel-clusters map that indicates (i) one or more clusters of pixels that were classified as associated with Photographic content of said source image, and (ii) one or more clusters of pixels that were classified as associated with Non-Photographic content of said source image;

(d) generating a composed image, by:

(d1) applying a first encoding technique to encode at least one of the clusters of pixels that were classified as associated with Photographic content of said source image;

(d2) applying a second, different, encoding technique to encode at least one of the clusters of pixels that were classified as associated with Non-Photographic content of said source image.

20. The system of claim 19, wherein step (b) comprises:

(b1) determining a gradient predictor for each pixel of said source image, based on gradient values of at least two neighboring pixels of said pixel;

(b2) determining a residual gradient predictor for each pixel of said source image, based on (I) the gradient predictor determined in step (b1) for said pixel, and (I) a gradient value of said pixel.

* * * * *